INVENTOR.
PAUL M. THOMAS.
BY
Willard S. Growl
ATTORNEY.

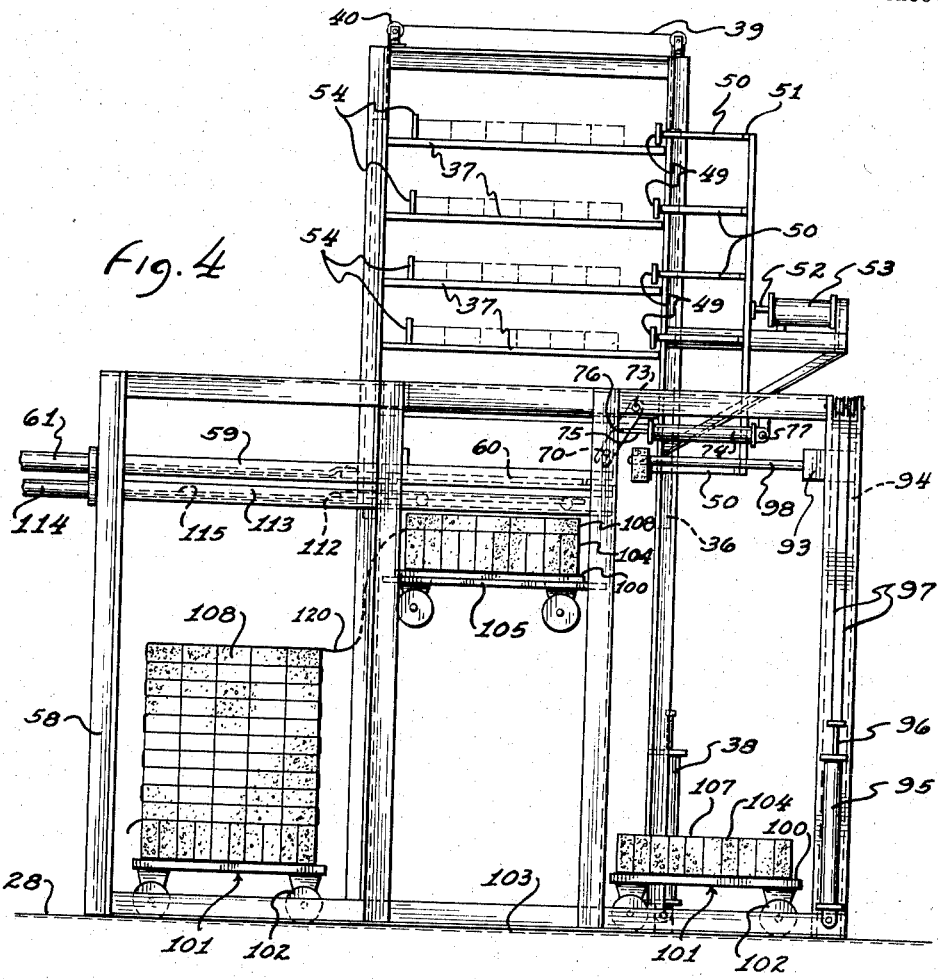
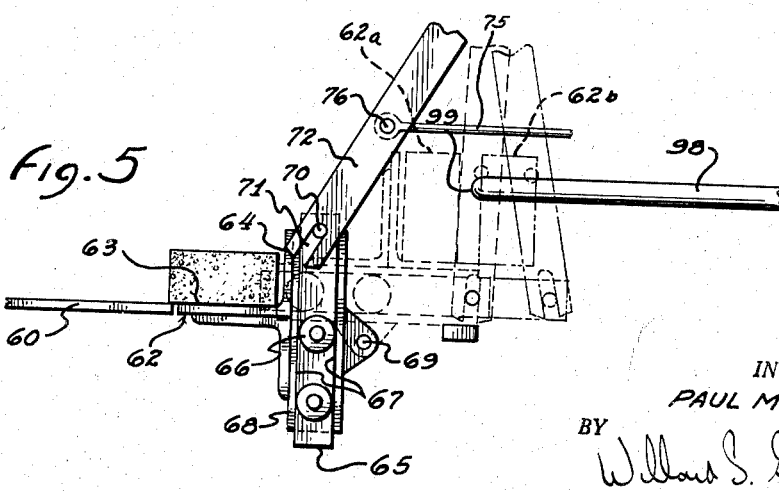

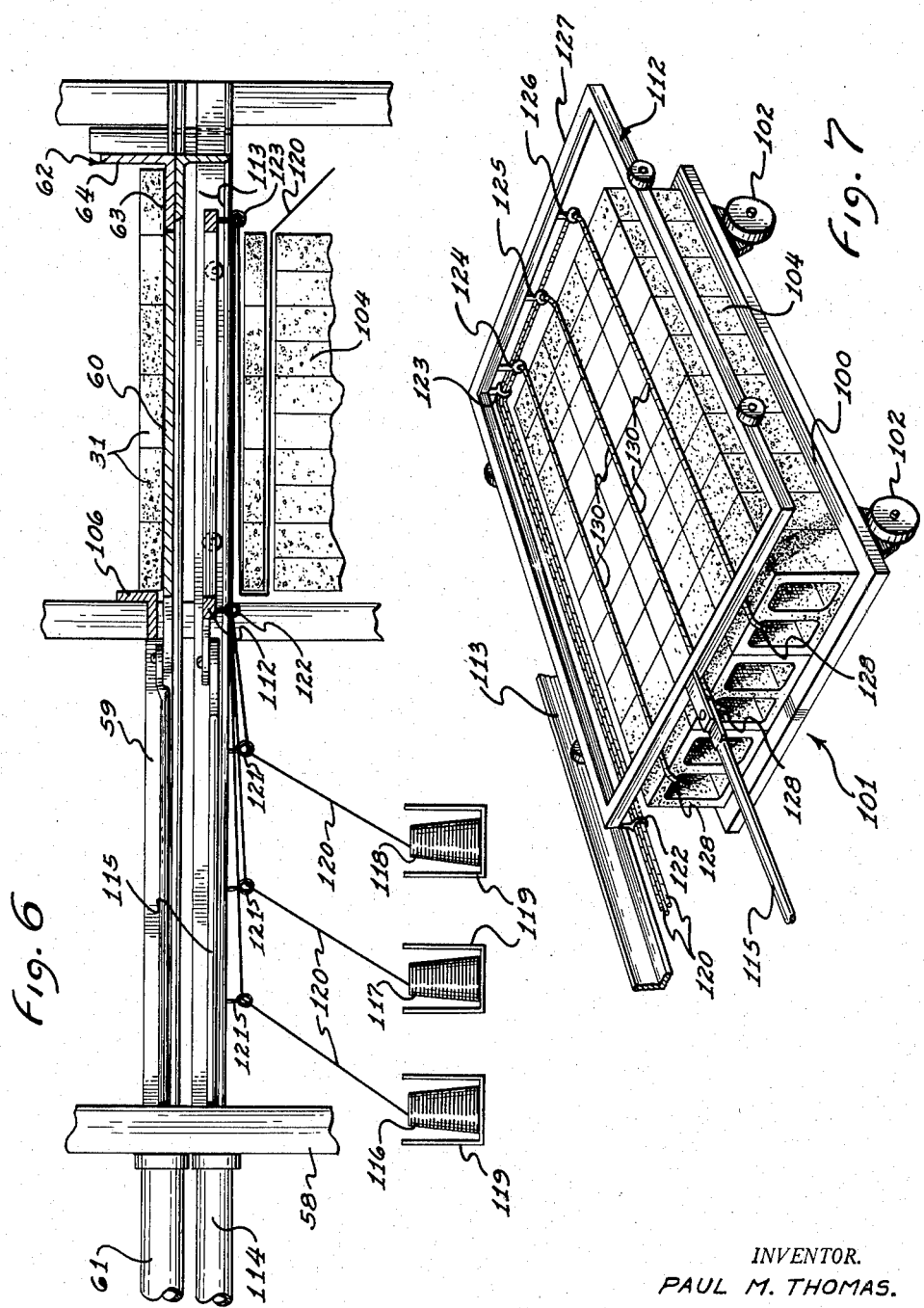

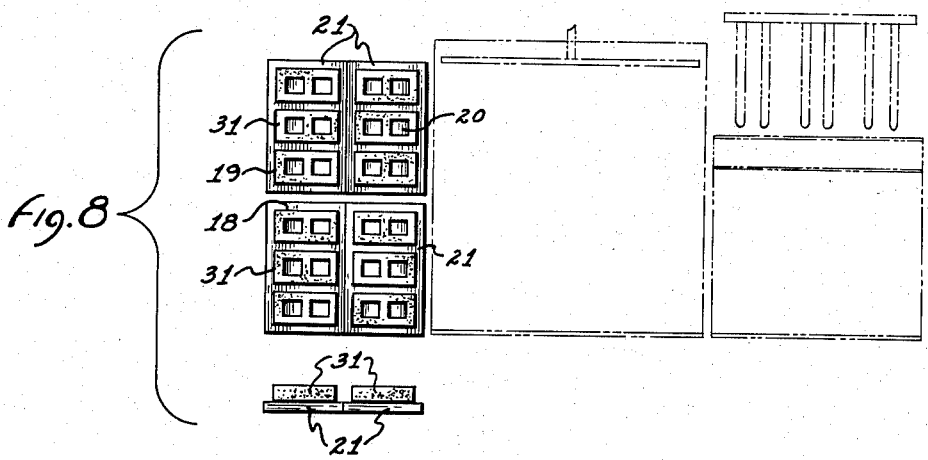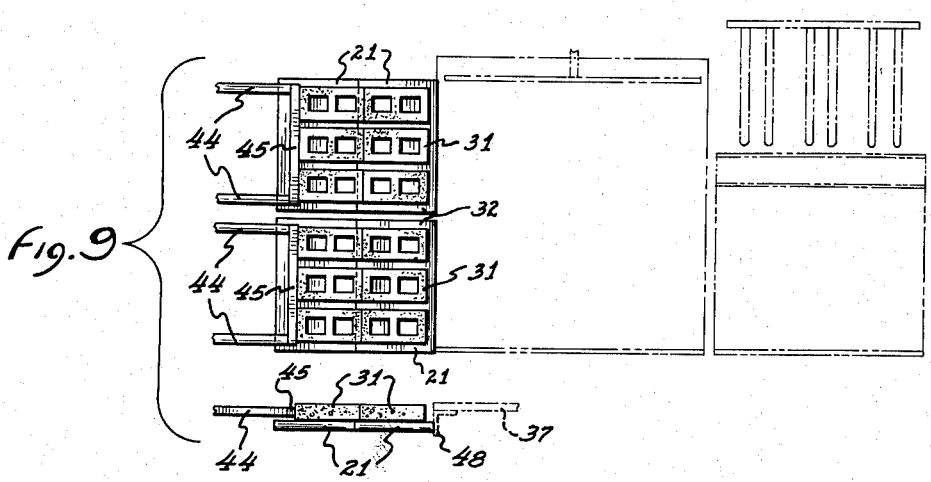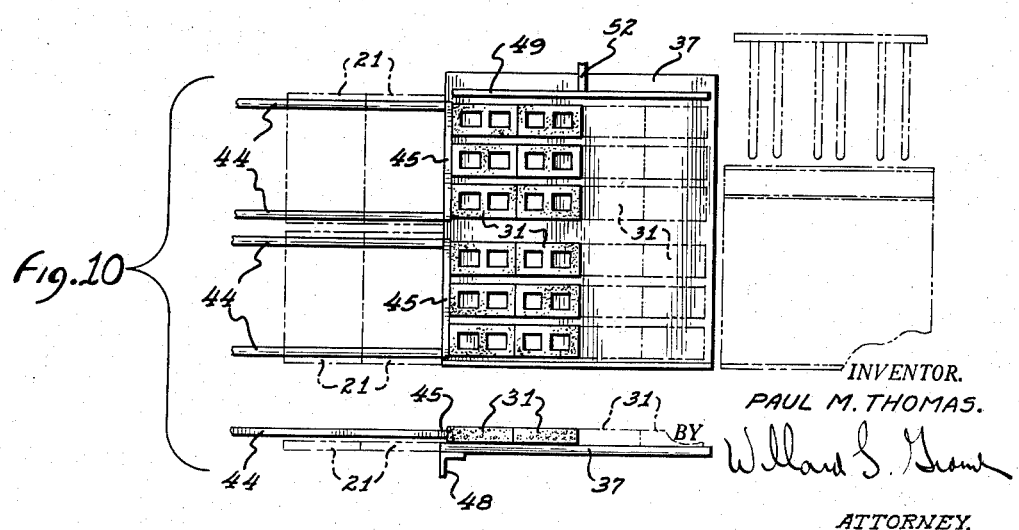

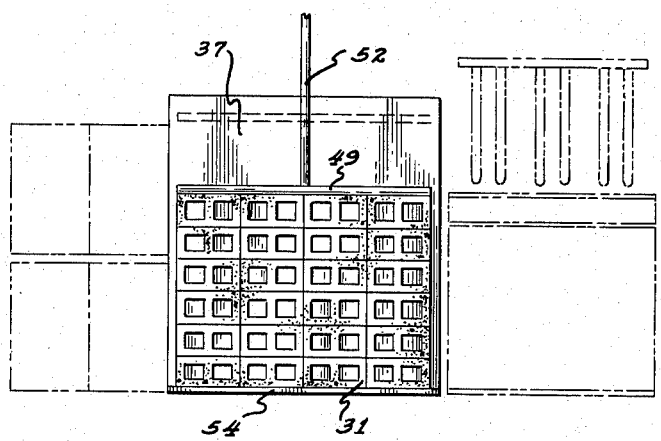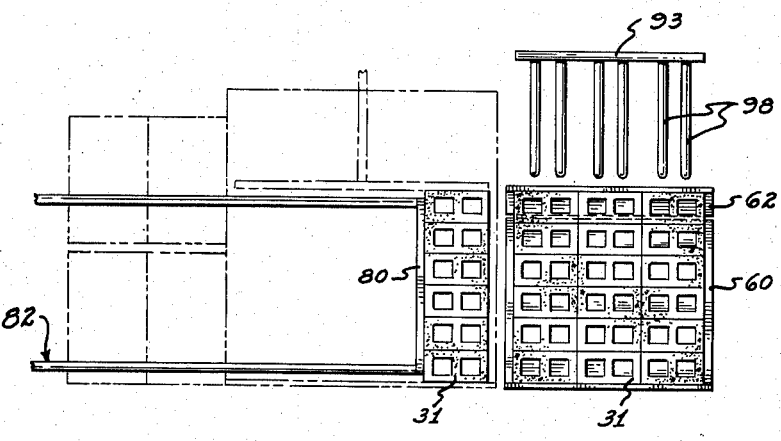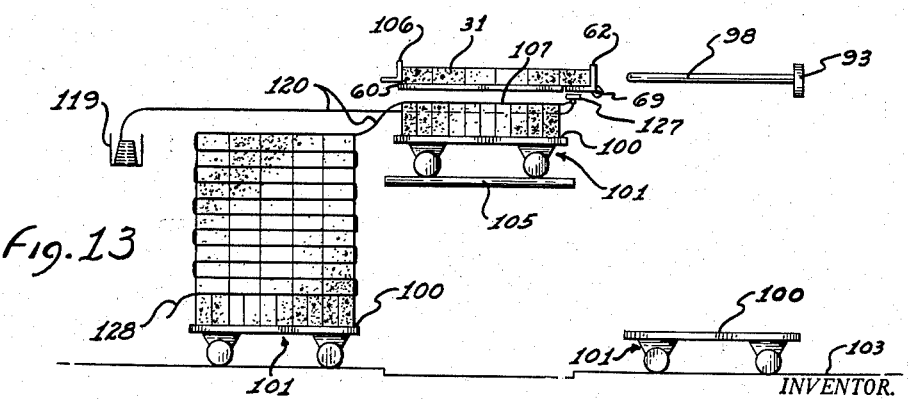

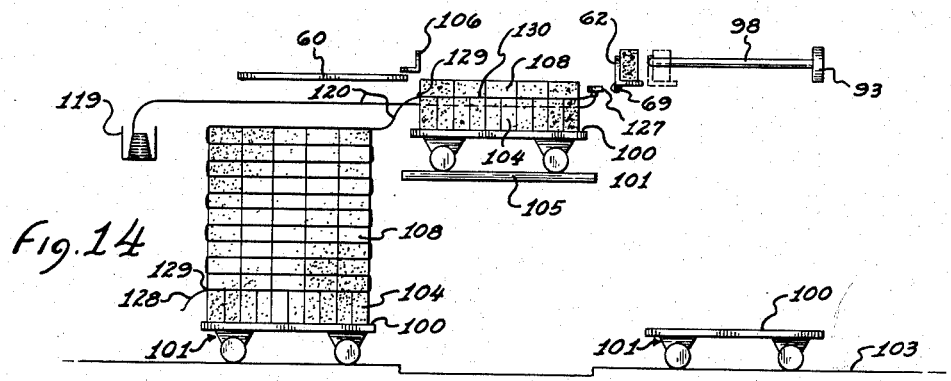
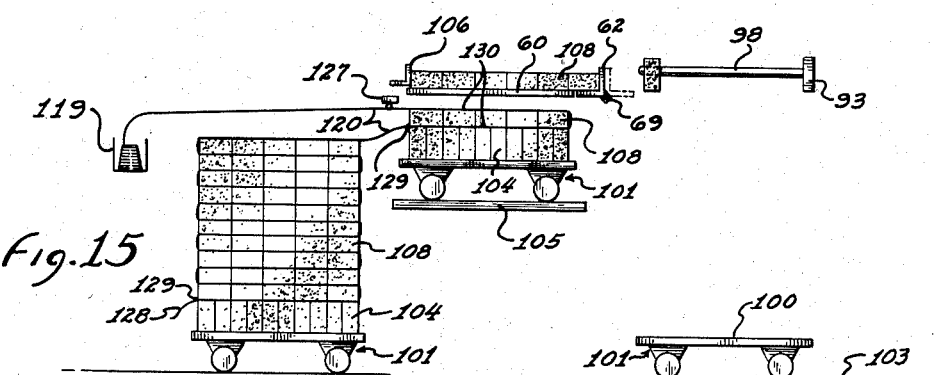
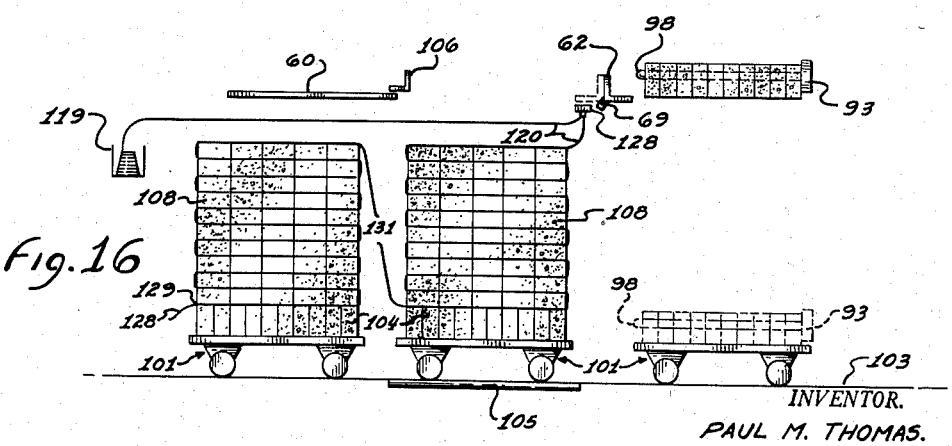

Jan. 20, 1959 P. M. THOMAS 2,869,737
APPARATUS FOR CUBING BUILDING BLOCKS
Filed July 11, 1955 9 Sheets-Sheet 9

INVENTOR.
PAUL M. THOMAS.
BY
Willard S. Grown
ATTORNEY.

United States Patent Office 2,869,737
Patented Jan. 20, 1959

2,869,737

APPARATUS FOR CUBING BUILDING BLOCKS

Paul M. Thomas, Phoenix, Ariz., assignor to Builders Equipment Company, Phoenix, Ariz., a corporation of Arizona Application July 11, 1955, Serial No. 520,997

6 Claims. (Cl. 214—6)

This invention pertains to improvements in an apparatus for cubing building blocks and is particularly directed to a procedure of accumulating and consolidating blocks received from a concrete block forming machine and placing them in a particularly arranged pile or cube stack for easy manipulation by a work handling device and is a continuation-in-part of my copending application Serial No. 335,187 now abandoned.

One of the objects of this invention is to provide an improved apparatus for carrying out the method of taking a series of building blocks which have been cured on the pallets received from the concrete block forming machine and to manipulate the blocks from the pallets to a final cubical stack having the lower row of the stack positioned endwise so that loading devices may be placed through the openings in the bottom row for manipulating the stack to any desired location.

Still another object of this invention is to provide an improved machine for handling a series of building blocks from the forming pallets and finally delivering them in a cubical stack capable of being manipulated for efficient handling and transportation.

Still another object of this invention is to provide an improved machine for taking building blocks from their forming pallets and moving them through a series of sequentially arranged steps to come up with a cubical pile arrangement having the lower series of blocks turned with their perforations horizontally disposed and with their various upper layers interlaced with securing cord to prevent dislodgement of the various layers during transportation of the cubical stack on a truck.

It is a further object of this invention to provide mechanism for efficiently removing formed cement blocks from their base pallets and to move various groups of said blocks through a machine structure such that a cubical pile of a predetermined configuration and arrangement results for efficient handling and transporting of the finished cubical stack.

Further features and advantages of this invention will appear from a detailed description of the drawings in which:

Fig. 4 is a rear end elevation indicated by the line 4—4 in Fig. 1.

Fig. 5 is an enlarged fragmentary view on the line 5—5 of Fig. 1.

Fig. 6 is an enlarged fragmentary section indicated by the line 6—6 of Figs. 1 and 2.

Fig. 7 is a perspective view of the cord weaving frame of the device.

Fig. 8 is a diagrammatic view showing the initial presentation of the blocks to be stacked on their forming pallets.

Fig. 9 is a diagrammatic view showing the initial breaking loose and removal of the building blocks from the pallets.

Fig. 10 is a diagrammatic view showing the building blocks being pushed to position for cuddling.

Fig. 11 is a view showing the cuddling or compacting of the building blocks.

Fig. 12 is a diagrammatic view showing the cuddled blocks moved to position on the trap door and rocking trough.

Fig. 13 shows a diagram indicating the initial beginning of the cube formation.

Fig. 14 is a diagram showing the positioning of the second row of blocks on the cubical stack.

Fig. 15 is a further diagram showing the completion of the intertwining of the cord over the second row of blocks.

Fig. 16 is a diagram showing the final stage of completing the cubing operation on a stack of blocks.

Fig. 17 is a perspective view showing the completed stack of corded blocks arranged in a cube ready for manipulation for transportation and the like.

Figure 1:
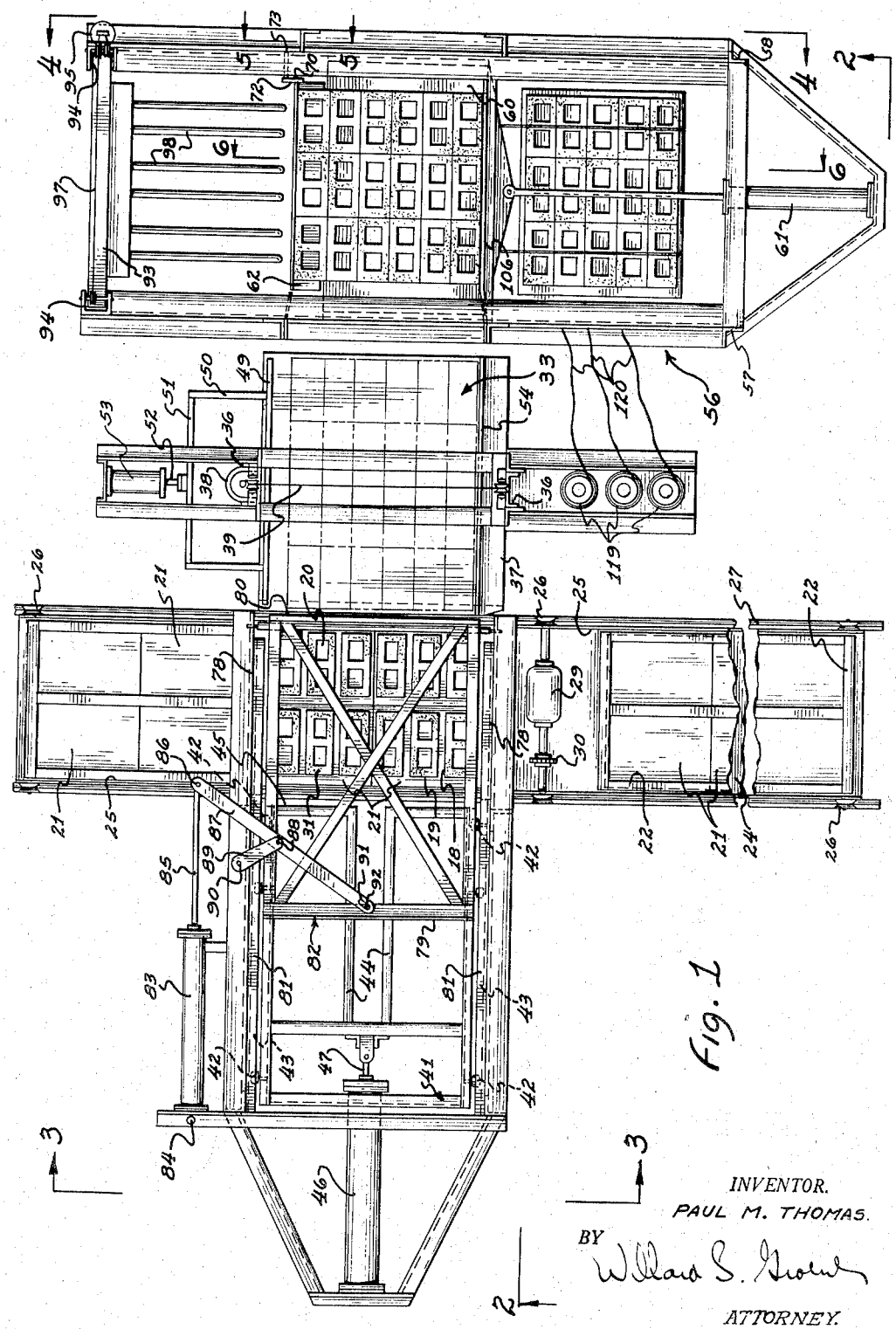
Fig. 1 is a plan view of apparatus incorporating the features of this invention.

As an example of one embodiment of this invention there is shown a building block cubing machine for handling building blocks usually made of cement or ceramic materials having the sides 18 and the ends 19 and the cored perforations 20. After the cement blocks are formed in the usual manner by automatic machinery of well known character forming no part of this invention, they are presented on pallets 21 which in turn are placed on drying and curing racks 22. These racks are usually removed from the curing ovens by suitable platform trucks and placed with the bottom ends 23 of their legs on the shuttle frame 24 comprising the side members 25 which are journaled on rollers 26 riding on the V-tracks 27 fixed to the floor 28 upon which the apparatus is mounted. A suitable drive motor 29 connected through suitable transmission means indicated generally at 30 to the rollers 26 provide means for moving or shuttling the frame 24 along the rails 27.

In this particular arrangement of the drying and curing racks 22, a group of six blocks 31 are each carried on pallets 21 and the motor 29 is appropriately energized to bring a series of four pallets into the position shown in Fig. 1. At this time the blocks 31 have dried and hardened and are cured but are adhesively stuck to the top surfaces 32 of the pallets 21.

Adjacent one side of the tracks 27 and the racks 22 carried thereon is the transfer and cuddler unit indicated generally at 33 comprising a rigid frame 34 having guideways 35 in which is vertically slidable the guide member 36 to which is rigidly fixed the transfer platforms 37, one for each of the shelves of the racks 22. This entire assembly of the guide members 36 and transfer platform 37 may be raised or lowered by suitable means such as a fluid pressure cylinder 38, Fig. 1, having the usual piston rod connected to the operating cables 39 operating over the idler pulleys 40 in any suitable manner so that energization of the cylinder 38 raises or lowers the transfer and cuddler unit 33. With the unit in lowered position with the platforms 37 each aligned with the shelves in the racks 22, the blocks 31 would then be in aligned position to be shoved out on to the platforms 37. The shoving action for thus moving the blocks 31 off of the pallets 21 is provided by the pusher frame 41 guided on suitable rollers 42 operating in the guide members 43 rigidly attached to the machine frame structure. A series of pusher arms 44 are rigidly fixed to the pusher frame 41 and extend inwardly with abutment ends 45 adapted to be engaged with the ends 19 of the blocks 31 on the pallets 21. A suitable fluid pressure actuating cylinder 46 fixed to the machine frame and having an extendable piston rod 47 connected to actuate the pusher frame 41 serves to reciprocate the pusher arms 44.

Figure 2:
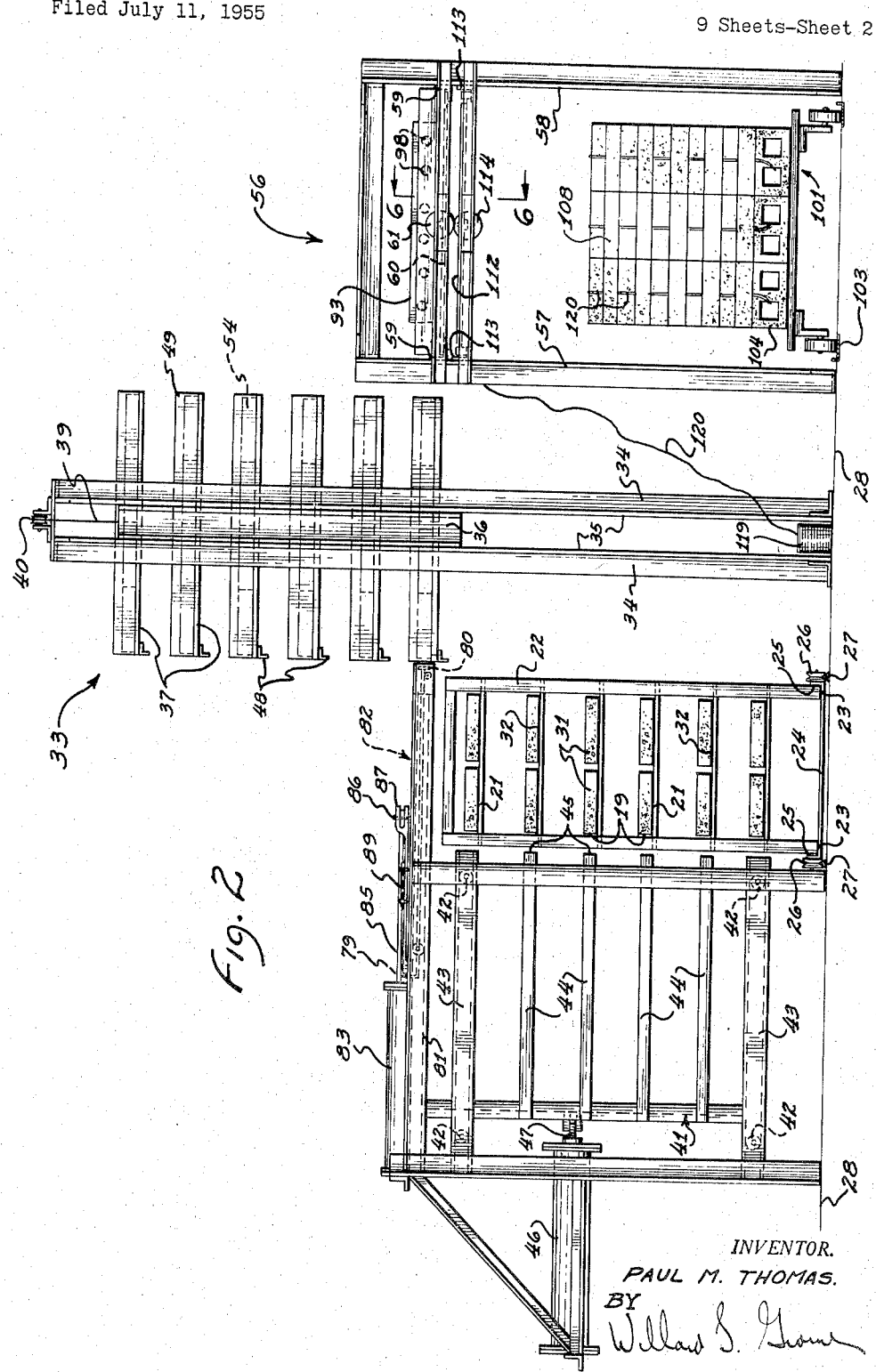
Fig. 2 is a right hand side elevation indicated by the line 2—2 of Fig. 1.
Figure 3:
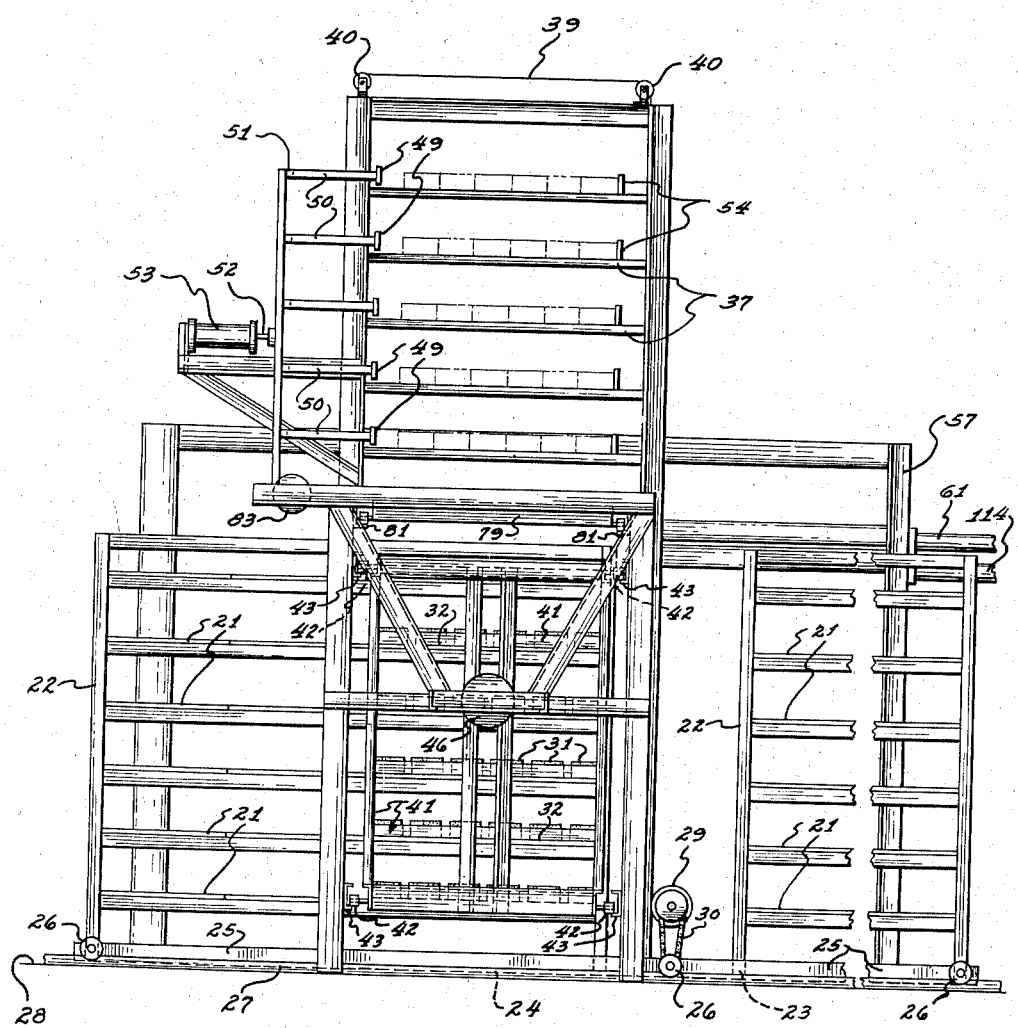
Fig. 3 is a front end elevation indicated by the line 3—3 of Fig. 1.

Because the blocks 31 are normally adhesively stuck to the pallets 21, the transfer and cuddler unit transfer platforms are not quite lowered to fully down position of exact horizontal alignment with the tops of the pallets 32 but they are held slightly upwardly so that when the pushers engage the ends 19 of the blocks on the pallets 21 the pallets will actually be partially slid off of the supporting shelves of the racks 22 and will engage the ends 48 of the platforms 37, Fig. 2, to thus arrest further sliding of the pallets out of the racks 22. Continued fluid pressure application appropriately in the cylinder 46 then causes the pusher arms 44 to break the cement blocks loose from the top surface 32 of the pallets 21 so that then they are free to be pushed further to the right on to the platforms 37, the platforms 37 then dropping to fully lowered aligned position with the top surfaces 32 of the pallets for the further movement of the blocks off of the pallets and on to the platforms 37.

Thus, all of the platforms 37 are loaded with the blocks which have been slid off of the pallets 21, but under these circumstances the blocks are initially placed in sidewise spaced relationship on the platforms 37. It is then necessary to effect a cuddling operation which is performed by a series of cuddler bars 49 which are carried on a series of support arms 50 connected to a cross head 51 actuated by the piston rod 52 of an actuating cylinder 53, the entire assembly of the cylinder 53, cross head 51 and cuddler bars 49 being carried on the members 36 and the elevating platforms 37 in any suitable manner. The cuddler bars 49 slide on top of the platforms 37 and may be moved toward the fixed guide bar 54 secured to the top surface of each of the platforms 37 in alignment with the sides 18 of the blocks as shown in Fig. 1 as they are removed from the pallets 21. Thus, when the fluid pressure cylinder 53 is energized to extend its piston rod 52 all of the blocks formerly widely spaced as they came off the pallets are now compacted together so all of their sides 18 are firmly in abutment contact. Thus, all of the blocks are cuddled into a compact mass both endwise and sidewise on the platforms 37.

On the opposite side of the transfer and cuddler unit 33 is located the cubing and tying unit 56 having a frame work rigidly fixed to the floor including the upright supports 57 and 58 to which is fixed the horizontal guide rails 59 in which is slidably mounted the trap door platform 60. This trap door platform is adapted to be reciprocated in the guideways 59 by suitable fluid pressure cylinder 61 rigidly mounted on the frame supports 57 and 58 in any suitable manner and having its piston rod suitably connected by operating mechanism to the trap door platform 60. There is also provided on the frame work 57—58 a rocking trough 62 having a block receiving surface 63 which may be swung into alignment horizontal and parallel to the top of the trap door platform 60 as shown best in Figs. 5 and 6. This rocking trough also has a block supporting surface 64 located at right angles to the block receiving surface 63. The trough 63—64 is mounted on a suitable slide piece 65 having guide rollers 66 rolling between the guideways 67 in the rocking bracket 68 which in turn is journaled on a suitable shaft 69 rigidly carried in the frame structure of the machine. The outer end of the slide piece 65 is provided with an actuating pin 70 which is engaged by the bifurcated slotted end 71 in an operating lever 72 pivotally mounted on a pin 73 fixed in the machine frame, the end of the operating lever 72 being connected to a suitable fluid pressure cylinder 74, Fig. 4, through its piston rod 75 and the pin 76 connected in the end of the piston rod 75, the rear end of the cylinder being pivotally connected by a pin 77 to the machine frame.

On the opposite side of the transfer and cuddler unit 33 from the trap door platform and the rocking trough 62 is the transfer pusher frame located in horizontal alignment with said members 60 and 62. This frame comprises the side member 78 interconnected by the rear cross member 79 and the abutment pusher cross member 80, the side members 78 sliding in suitable guideways 81 in the frame of the machine. The transfer pusher member indicated generally at 82 is reciprocated by a suitable fluid pressure cylinder 83 pivotally mounted on a suitable pin 84 at its rear end on the machine frame and having a piston rod 85 connected by a suitable pin 86 to the outer end of an actuating link 87 in turn pivotally connected by a pin 88 intermediate its ends to a link 89 pivotally mounted in turn at 90 on the machine frame, the other end of the actuating link having a slot 91 engaging over the operating pin 92 fixed in the rear cross member 79.

Thus, when any one of the transfer platforms 37 are brought into alignment with the transfer pusher member 82 and the trap door platform 60 and the surface 63 of the rocking trough 62 the fluid pressure cylinder may be energized to push the cuddled group of blocks of appropriate number on to the trap door platform 60 and the surface 63 of the trough. Any number of rows of blocks may be thus pushed off of the platforms 37 and by appropriately raising and lowering the transfer and cuddler unit 33 each of the platforms 37 may be selectively presented for unloading on to the trap door and rocking trough 60—62. It will be noted that only one row, Fig. 6, of blocks is presented on the surface 63 of the rocking trough 62 while a plurality or any desired number of additional rows of blocks are pushed out endwise on to the trap door platform 60 at the same time.

On the opposite side of the rocking trough 62 from the trap door 60 is located the cross head 93 of Fig. 1 which is vertically reciprocable in suitable guideways 94 by a suitable fluid pressure cylinder 95 having its piston rod 96 connected through suitable cable means 97 to the cross head 93. A series of block receiving tines 98 are fixed to project horizontally outwardly from the cross head 93 to the position shown best in Figs. 4 and 5. These tines have suitable rounded ends 99 over which blocks may be presented by the tipping and sliding action of the rocking trough 62. This is accomplished, as best shown in Fig. 5, by the operation of the fluid pressure cylinder 74 in retracting its piston rod so as to initially rock the trough 63—64 upwardly to the position 62a shown in broken line whereupon the row of blocks on the surface 63 are then turned up on end 90 degrees to rest on the surface 64 of the rocking trough. Further withdrawal of the piston rod 75 into the cylinder 74 moves the trough and block to the broken line position 62b which causes the row of blocks to be presented just over the ends of the tines 98. Continuous repetition of this operation occurs until a whole series of blocks have been pushed on clear back substantially to the cross head 93 to complete a stack of now vertically positioned blocks hanging on the tines 98. In this manner, with the tines 98 and cross head in its upward position, all of the blocks are finally formed and stacked vertically to form the bottom or base row of the cube of blocks to be formed.

A cylinder 95 is then energized in such a manner as to lower the cross head and tines with the complete stack of blocks thereon until they arrive at the lowered position and are presented on the top surface 100 of the cube carrying carts indicated generally at 101, these carts having suitable caster rollers 102 operating on suitable guideway tracks 103 rigidly connected to the machine frame and floor upon which it is positioned. With a cart having a stack of vertically positioned blocks shown at 104 in Fig. 4 on its top surface 100, it is then rolled to the position directly under the trap door 60 whereupon a suitable elevating platform 105 engages the cart and raises it up with the vertical stack of blocks 104 closely adjacent the underside of the trap door 60 as best shown in Figs. 4 and 6. At this time the fluid pressure cylinder 61 is energized to withdraw the trap door 60 to the left, Figs. 6 and 14, the abutment rail 106 holding the blocks on the trap door so that they will be scraped off and dropped down on the top surface 107 of the blocks standing on their side 104 on the cart 101. At the same time the rocking trough moves up to the position 62a and then ultimately to position 62b to present a series of vertically disposed blocks to hang on the tines 98 as described, see Fig. 5. The trap door and rocking trough 60—62 then return to their respective closed positions shown in Fig. 6 ready to receive another supply of building blocks from one of the transfer platforms 37 when the transfer pusher member 82 is operated as described.

This operation continues until the desired number of horizontally disposed blocks 108 is accumulated on top of the vertically disposed group 104, the member 105 lowering with each stack of blocks so as to maintain a predetermined distance between the underside of the trap door and the top surface of the last set of blocks deposited. Finally, the cart 101 is lowered all the way down to the tracks 103 at the completion of the stacking of the cube. By this time also a complete set of vertically disposed blocks have been presented on the tines 98 and the tines then move down and deposit the vertically disposed set of blocks 104 on the next cart 101 about to be moved under the trap door and elevated for repeating the cycle of loading the horizontally disposed blocks in layers thereon. At the completion of the cubing or stacking of the blocks with the cart now down on the rails 103, the cart is then rolled off to the left, Fig. 4, to a convenient location where it may be relieved of its load by the insertion of tines 109 located on a suitable lift truck 110, into the openings 111 of the vertically disposed bottom set of blocks for transporting the cubical stack to any desired location, the openings 111 serving also to facilitate manipulation of the stack when loading and unloading the cubes on trucks or other suitable vehicles such as shown in my co-pending patent application, Serial No. 335,187, now abandoned, filed Feb. 5, 1953 and my copending patent application, Serial No. 434,819 filed June 7, 1954, now Patent No. 2,804,980.

In order to increase the stability of the cubical stack of blocks for transporting and handling there has been provided an arrangement operating in conjunction with the aforementioned procedure for threading cords or twine in between the various layers of blocks so that they will not normally jar loose from their stack and drop out of the pile and otherwise cause deterioration of the stack and damage to the blocks. This apparatus comprises a twine shuttle frame 112, shown best in Figs. 6 and 7, which moves horizontally in suitable guideways 113 fixed to the frame of the device. The frame is connected to be actuated by any suitable power means such, for example, as the fluid pressure cylinder 114 rigidly mounted on the machine frame and having its piston rod 115 appropriately connected to the frame 112. A plurality of balls of twine 116, 117 and 118 are carried in twine holder cans 119 fixed to the machine frame and the twine unwinds from each of the balls 116, 117 and 118 in the lines 120 and pass up through the eyelets 121 fixed slightly below and to one side of the shuttle frame 112 on the machine frame. From the eyelets 121 fixed to the machine frame the lines 120 go through the guide eyelet 122 and then through the guide eyelet 123 fixed to the twine shuttle frame 112 along one side thereof and offset outwardly from the outer edge of the cube of blocks to be formed on the top surface 100 of the cart 101. The lines 120 then each individually pass through the respective threading eyelets 124, 125 and 126 fixed on the front rail 127 of the twine shuttle frame 112. These three threading eyelets 124, 125 and 126 are arranged to travel across the top of the blocks from one end to the other as best shown in Fig. 7 upon actuation appropriately of the cylinder 114.

Figure 17:
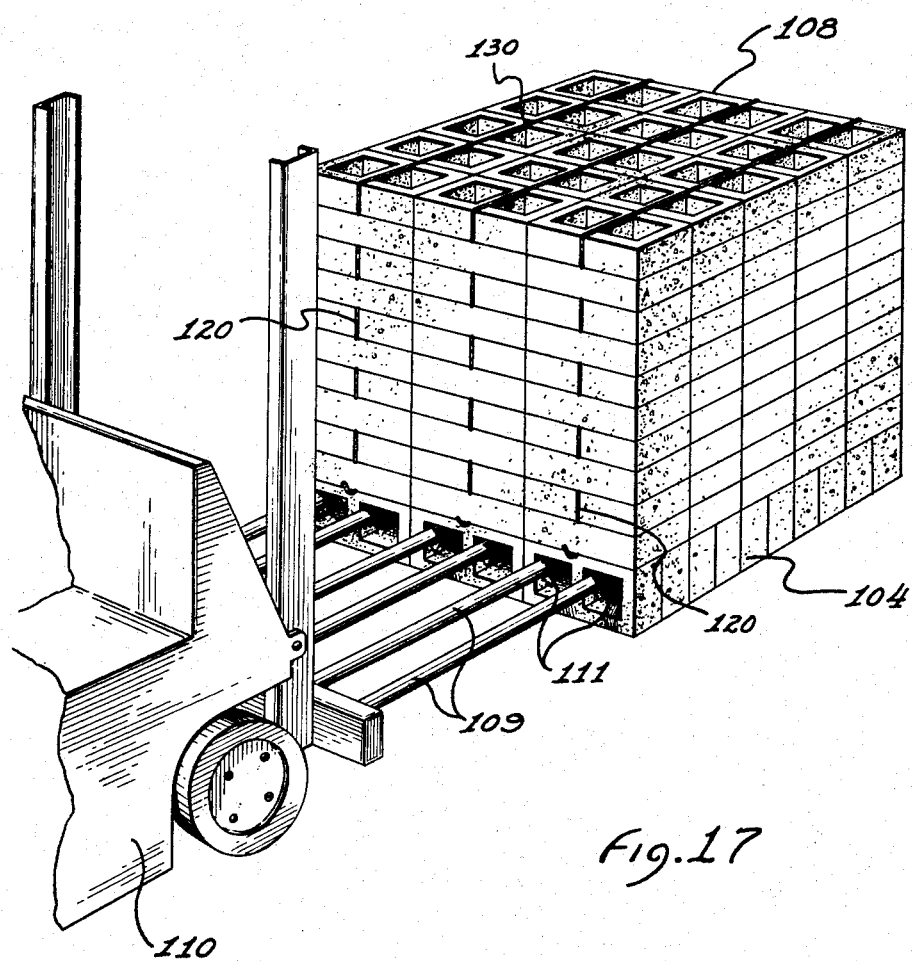

Initially, with a stack of vertically disposed blocks on the surface 100 on top of the cart 101 as shown best in Fig. 7, and with the ends 128 of the twine cords held by suitable means such as by the previous cube that has just been formed such as at the point 129, Fig. 14, the shuttle moves from left to right, Figs. 6 and 7, stretching the cords at 130 by moving from right to left with the cord being unwrapped from the balls 116, 117 and 118 and moving out through the various eyelets recited. After this movement of the shuttle has taken place, the trap door 60 is then withdrawn to the left, Fig. 6, as described and a first set of blocks are deposited on top of the strings and the blocks immediately thereunder. The trap door then closes and receives another load of blocks and during this time the shuttle 112 then moves to the right, Figs. 6 and 7, again stretching another series of lines 130 across the top of the blocks just deposited. Then the trap door is again opened and another series of blocks deposited thereon, the trap door closes to receive the next load and then again the shuttle shifts to the opposite direction to again lace the twine over the top of the set of blocks just deposited. This operation continues until the twine has then been inter-wrapped between the various layers to come up with the cube with the twine between the different layers of blocks as best shown in Fig. 17, the twine thus serving as a strengthening medium to tie all of the blocks together and prevent them from shaking loose during transportation and handling.

In order to summarize the basic principles of the operation of this method and apparatus, attention is directed to Figs. 8 through 16 inclusive. In Fig. 8 is shown the initial presentation of the building blocks 31 adhesively stuck to the pallets 21. The next step is that shown in Fig. 9 wherein the pusher arms 44 engage the blocks 31 and breaks them loose from the pallets 21, the pallets initially engaging the abutment ends 48 of the transfer platforms 37 to effect this breaking loose of the blocks from the pallets. The platforms 37 then are lowered to exact level relationship with the top of the pallets 21 and the pusher arms 44 push the blocks over on to the transfer platform 37 as shown in Fig. 10.

In Fig. 11 the cuddling operation then takes place wherein the cuddler bars 49 compress the blocks against the fixed guide bar 54 to take out all slack between the blocks and compact them sidewise on the platforms 37.

In Fig. 12 the transfer pusher member then comes into operation and pushes the cuddled or compacted blocks out on to the trap door 60 and the rocking trough 62.

In Fig. 13 is shown the blocks thus presented out on the trap door and rocking trough, with the cube carrying cart 101 raised to position with its first set of vertically disposed building blocks on its top surface 100. The shuttle 127 then brings the first set of twine over the top of these vertically positioned blocks after which the trap door 60 opens and drops its set of blocks on top of the twine and the vertically disposed blocks while at the same time the rocking trough 62 presents a set of blocks now in vertical position on the tines 98.

Fig. 14 shows the condition of the blocks having been dropped on top of the strings and on top of the vertically disposed blocks on the cart while the rocking trough 62 has presented its blocks to the ends of the tines 98, preferably the strings being held by the previous stack of blocks just released from under the trap door arrangement.

In Fig. 15 shows the next operation wherein the shuttle then moves again to the left to bring more string over the top of the layer just deposited while a new set of blocks is pushed off the transfer platform on to the trap door and rocking trough which have now been returned to the normal receiving position as shown in Fig. 15. This operation continues with the cart 101 under the trap door constantly lowering with each stack of blocks presented thereon and it is important to note that during this continuous lowering operation the ends of the string finally break at 131 as the cube sinks lower and lower so as to automatically separate the twine from the previous cube just completed. Finally, as the cubical stack reaches the tracks 103 the previous stack which, of course, has been pushed out from the machine ready to be transported and the stack just finished moved out to position just occupied by the one completed. In so doing, further string is stretched out from the balls of twine sufficient so that the shuttle can then start intertwining the cord in the next stack as described. Meanwhile the tines have lowered to put a new set of vertically disposed blocks on the next cart which, as it is rolled into position under the trap door, will automatically be carried off the tines as best shown in Fig. 16. The operation is then repeated as described. All of the various actuating elements for the machine energized by the fluid pressure cylinders or any other suitable means may be interlocked and interconnected in a substantially automatic cycle, the details of which arrangement form no specific part of this invention. It is important to note that the sequential procedure beginning with the blocks adhesively stuck to the pallets coming from the curing and drying racks to the end product of the cubical stack of the vertically disposed bottom rows for handling through the openings therein is accomplished by the recited elements and functioning thereof.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an apparatus for cubing building blocks, a frame, a shuttle frame reciprocable relative to said frame having means to receive drying racks, pallets slidable transversely on said racks having building blocks on the top surfaces thereof, pusher arms slidably mounted on said frame adapted to move transversely of said drying racks at right angles to said shuttle frame movement to push said blocks endwise off of said pallets, a transfer and cuddler unit having a series of horizontally disposed transfer platforms to receive blocks pushed from said pallets, a fixed guide bar on one side of said transfer platforms having a vertical abutment surface parallel to the direction of movement of said blocks as pushed off of said pallets, a transfer pusher member on said frame located above said pusher arms, means for vertically reciprocating said transfer platforms to position said transfer platforms in horizontal alignment with said pallets on said drying racks and in horizontal alignment with said transfer pusher member, a cubing unit located on the opposite side of said transfer unit from said shuttle frame and drying racks including a trap door platform and a rocking trough located in horizontal alignment with said transfer pusher member so that said transfer pusher member may move blocks from said transfer platforms on to said trap door platform and said rocking trough, a vertically reciprocable crosshead on said frame having a series of horizonally disposed tines from said crosshead extending toward and positioned at right angles to said rocking trough adapted to receive blocks turned up vertically by said rocking trough with the cored holes of said blocks being received over said tines, a track extending parallel to said tines located beneath said trap door platform, cube carrying carts traveling on said tracks adapted to be moved from a position under said tines to a position under said trap door platform, means on said frame to vertically lift said carts from said track when said carts are under said trap door platform, means for horizontally shifting said trap door platform to and from said rocking trough and for rocking said trough, and an abutment rail fixed to said frame to restrict movement of blocks on said trap door platform relative to said frame as said trap door platform is withdrawn from under said blocks to deposit said blocks on the cubical stack to be formed.

2. In an apparatus for cubing building blocks, a frame, a shuttle frame reciprocable relative to said frame having means to receive drying racks, pallets slidable transversely on said racks having building blocks on the top surfaces thereof, pusher arms slidably mounted on said frame adapted to move transversely of said drying racks at right angles to said shuttle frame movement to push said blocks endwise off of said pallets, a transfer and cuddler unit having a series of horizontally disposed transfer platforms to receive blocks pushed from said pallets, a fixed guide bar on one side of said transfer platforms having a vertical abutment surface parallel to the direction of movement of said blocks as pushed off of said pallets, a transfer pusher member on said frame located above said pusher arms, means for vertically reciprocating said transfer platforms to position said transfer platforms in horizontal alignment with said pallets on said drying racks and in horizontal alignment with said transfer pusher member, a cubing unit located on the opposite side of said transfer unit from said shuttle frame and drying racks including a trap door platform and a rocking trough located in horizontal alignment with said transfer pusher member so that said transfer pusher member may move blocks from said transfer platforms on to said trap door platform and said rocking trough, a vertically reciprocable crosshead on said frame having a series of horizontally disposed tines from said crosshead extending toward and positioned at right angles to said rocking trough adapted to receive blocks turned up vertically by said rocking trough with the cored holes of said blocks being received over said tines, a track extending parallel to said tines located beneath said trap door platform, cube carrying carts traveling on said tracks adapted to be moved from a position under said tines to a position under said trap door platform, means on said frame to vertically lift said carts from said track when said carts are under said trap door platform, means for horizontally shifting said trap door platform to and from said rocking trough and for rocking said trough, an abutment rail fixed to said frame to restrict movement of blocks on said trapdoor platform relative to said frame as said trapdoor platform is withdrawn from under said blocks to deposit said blocks on the cubical stack to be formed, a twine shuttle frame reciprocable on said machine frame parallel to the direction of movement of said trap door platform adapted to place twine between each layer of blocks deposited in said cubical stack.

3. In an apparatus for cubing building blocks, a frame, a shuttle frame reciprocable relative to said frame having means to receive drying racks, pallets slidable transversely on said racks having building blocks on the top surfaces thereof, pusher arms slidably mounted on said frame adapted to move transversely of said drying racks at right angles to said shuttle frame movement to push said blocks endwise off of said pallets, a transfer and cuddler unit having a series of horizontally disposed transfer platforms to receive blocks pushed from said pallets, a fixed guide bar on one side of said transfer platforms having a vertical abutment surface parallel to the direction of movement of said blocks as pushed off of said pallets, a transfer pusher member on said frame located above said pusher arms, means for vertically reciprocating said transfer platforms to position said transfer platforms in horizontal alignment with said pallets on said drying racks and in horizontal alignment with said transfer pusher member, a cubing unit located on the opposite side of said transfer unit from said shuttle frame and drying racks including a trap door platform and a rocking trough located in horizontal alignment with said transfer pusher member so that said transfer pusher member may move blocks from said transfer platforms on to said trap door platform and said rocking trough, a vertically reciprocable crosshead on said frame having a series of horizontally disposed tines from said crosshead extending toward and positioned at right angles to said rocking trough adapted to receive blocks turned up vertically by said rocking trough with the cored holes of said blocks being received over said tines, a track extending parallel to said tines located beneath said trap door platform, cube carrying carts traveling on said tracks adapted to be moved from a position under said tines to a position under said trapdoor platform, means on said frame to vertically lift said carts from said track when said carts are under said trap door platform, means for horizontally shifting said trap door platform to and from said rocking trough and for rocking said trough, an abutment rail fixed to said frame to restrict movement of blocks on said trap door platform relative to said frame as said trapdoor platform is withdrawn from under said blocks to deposit said blocks on the cubical stack to be formed, a twine shuttle frame reciprocable on said machine frame parallel to the direction of movement of said trap door platform adapted to place twine between each layer of blocks deposited in said cubical stack, said twine shuttle frame including downwardly positioned threading eyelets traveling over the top of the layers of blocks in said stack, twine holder cans, twine balls in said cans having the twine unwrapped therefrom extending through said threading eyelets, the outer ends of said twine being held during the movement of said twine shuttle frame over the cubical stack being formed by the top layer of the stack previously formed.

4. In an apparatus for cubing building blocks, a frame, a shuttle frame reciprocable relative to said frame having means to receive drying racks, pallets slidable transversely on said racks having building blocks on the top surfaces thereof, pusher arms slidably mounted on said frame adapted to move transversely of said drying racks at right angles to said shuttle frame movement to push said blocks endwise off of said pallets, a transfer and cuddler unit having a series of horizontally disposed transfer platforms to receive blocks pushed from said pallets, a fixed guide bar on one side of said transfer platforms having a vertical abutment surface parallel to the direction of movement of said blocks as pushed off of said pallets, a transfer pusher member on said frame located above said pusher arms, means for vertically reciprocating said transfer platforms to position said transfer platforms in horizontal alignment with said pallets on said drying racks and in horizontal alignment with said transfer pusher member, a cubing unit located on the opposite side of said transfer unit from said shuttle frame and drying racks including a trap door platform and a rocking trough located in horizontal alignment with said transfer pusher member so that said transfer pusher member may move blocks from said transfer platforms on to said trap door platform and said rocking trough, a vertically reciprocable crosshead on said frame having a series of horizontally disposed tines from said crosshead extending toward and positioned at right angles to said rocking trough adapted to receive blocks turned up vertically by said rocking trough with the cored holes of said blocks being received over said tines, a track extending parallel to said tines located beneath said trap door platform, cube carrying carts traveling on said tracks adapted to be moved from a position under said tines to a position under said trap door platform, means on said frame to vertically lift said carts from said track when said carts are under said trap door platform, means for horizontally shifting said trap door platform to and from said rocking trough and for rocking said trough, an abutment rail fixed to said frame to restrict movement of blocks on said trap door platform relative to said frame as said trap door platform is withdrawn from under said blocks to deposit said blocks on the cubical stack to be formed, a twine shuttle frame reciprocable on said machine frame parallel to the direction of movement of said trap door platform adapted to place twine between each layer of blocks deposited in said cubical stack, said twine shuttle frame including downwardly positioned threading eyelets traveling over the top of the layers of blocks in said stack, twine holder cans, twine balls in said cans having the twine unwrapped therefrom extending through said threading eyelets, the outer ends of said twine being held during the movement of said twine shuttle frame over the cubical stack being formed by the top layer of the stack previously formed, and means for progressively lowering the cart upon which the cubical stack is being formed to cause a severance of the twine cords between said stack and the stack previously formed.

5. A building block cubing machine having a frame, a pallet rack supporting and positioning device on said frame, means including horizontally reciprocable pusher arms on said frame to engage and remove blocks from pallets on said pallet rack, a transfer and cuddler unit including vertically spaced transfer platforms vertically movable on said frame arranged to receive blocks removed from said pallets, a rocking trough pivotally mounted on said frame and a trap door platform horizontally slidable on said frame adapted to receive blocks from said transfer and cuddler unit platforms, a cube carrying device having a horizontal top surface vertically reciprocable and horizontally movable on said frame under said trap door and rocking trough adapted to receive blocks from said trap door, horizontally disposed tines to one side of said rocking trough and trap door vertically reciprocable on said frame and adapted to receive upturned blocks from said rocking trough, and means on said frame for lowering said tines with upturned blocks thereon to deposit said blocks on said horizontal top surface of said cube carrying device when moved horizontally from under said trap door to under said tines.

6. In a building block cubing machine as set forth in claim 5 wherein there is provided a twine shuttle device horizontally movable on said frame under said trap door and over the top of the blocks deposited on said top horizontal surface of said cube carrying device.

References Cited in the file of this patent
UNITED STATES PATENTS

| | | |
|---|---|---|
| 2,181,357 | Chipman | Nov. 28, 1939 |
| 2,467,113 | Deiters | Apr. 12, 1949 |
| 2,508,698 | Von Beren | May 23, 1950 |
| 2,647,646 | Naillon | Aug. 4, 1953 |
| 2,662,649 | Gill et al. | Dec. 15, 1953 |
| 2,710,696 | Fontaine et al. | June 14, 1955 |
| 2,718,972 | Temple | Sept. 27, 1955 |
| 2,780,340 | Hynson | Feb. 5, 1957 |